United States Patent
Wang

(10) Patent No.: US 8,526,796 B2
(45) Date of Patent: Sep. 3, 2013

(54) NETWORK VIDEO RECORDER AND METHOD FOR RECORDING VIDEO DATA IN THE NETWORK VIDEO RECORDER

(75) Inventor: Hung-Jung Wang, New Taipei (TW)

(73) Assignee: Ingrasys Technology Inc., Taoyuan (TW)

( * ) Notice: Subject to any disclaimer, the term of this patent is extended or adjusted under 35 U.S.C. 154(b) by 125 days.

(21) Appl. No.: 13/340,696

(22) Filed: Dec. 30, 2011

(65) Prior Publication Data

US 2012/0237188 A1   Sep. 20, 2012

(30) Foreign Application Priority Data

Mar. 16, 2011   (TW) .............................. 100109039 A

(51) Int. Cl.
*H04N 5/765*   (2006.01)
(52) U.S. Cl.
USPC .......................................... 386/326; 386/329
(58) Field of Classification Search
USPC ................................................. 386/326, 329
See application file for complete search history.

(56) References Cited

U.S. PATENT DOCUMENTS

| 5,999,691 | A | * | 12/1999 | Takagi et al. | 386/337 |
| 7,881,587 | B2 | * | 2/2011 | Shinkai et al. | 386/248 |
| 2004/0013406 | A1 | * | 1/2004 | Barton et al. | 386/69 |
| 2008/0297599 | A1 | * | 12/2008 | Donovan et al. | 348/143 |
| 2010/0115121 | A1 | * | 5/2010 | Roos et al. | 709/231 |

* cited by examiner

*Primary Examiner* — Thai Tran
*Assistant Examiner* — Jose Mesa
(74) *Attorney, Agent, or Firm* — Altis Law Group, Inc.

(57) ABSTRACT

In a network video recorder (NVR), a starting location and an end location of video data in a file are set. One frame of video data is recorded in one element of a storage buffer and the element has an index. The NVR further sets a starting location and an end location that coincides with the index of a frame of video data in the storage buffer. If the NVR receives a frame and not enough space of the storage buffer, the NVR adjusts the starting location of the storage buffer by one element, and adjusts the starting location of the file to the starting location of the frame in the storage buffer. If enough space is and the frame is the Intra-frame, the NVR adjusts the end location of the file by one frame, and adjusts the end location of the storage buffer by one element.

12 Claims, 5 Drawing Sheets

NETWORK VIDEO RECORDER AND METHOD FOR RECORDING VIDEO DATA IN THE NETWORK VIDEO RECORDER

BACKGROUND

1. Technical Field

Embodiments of the present disclosure generally relate to network video recorder (NVR) management, and more particularly to a NVR and a method for recording video data in the NVR.

2. Description of Related Art

Network video recorders (NVRs) are commonly used in video devices, and record video data captured by a video device, such as a camera. The video data is encoded and processed by the camera and then streamed to the NVR for storage or remote viewing. However, if a user does not clear out storage space of the NVR as needed, then when the storage space is full the NVR will become unavailable and video data will be lost since it cannot be recorded in the NVR.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or computer storage device.

Figure 1:
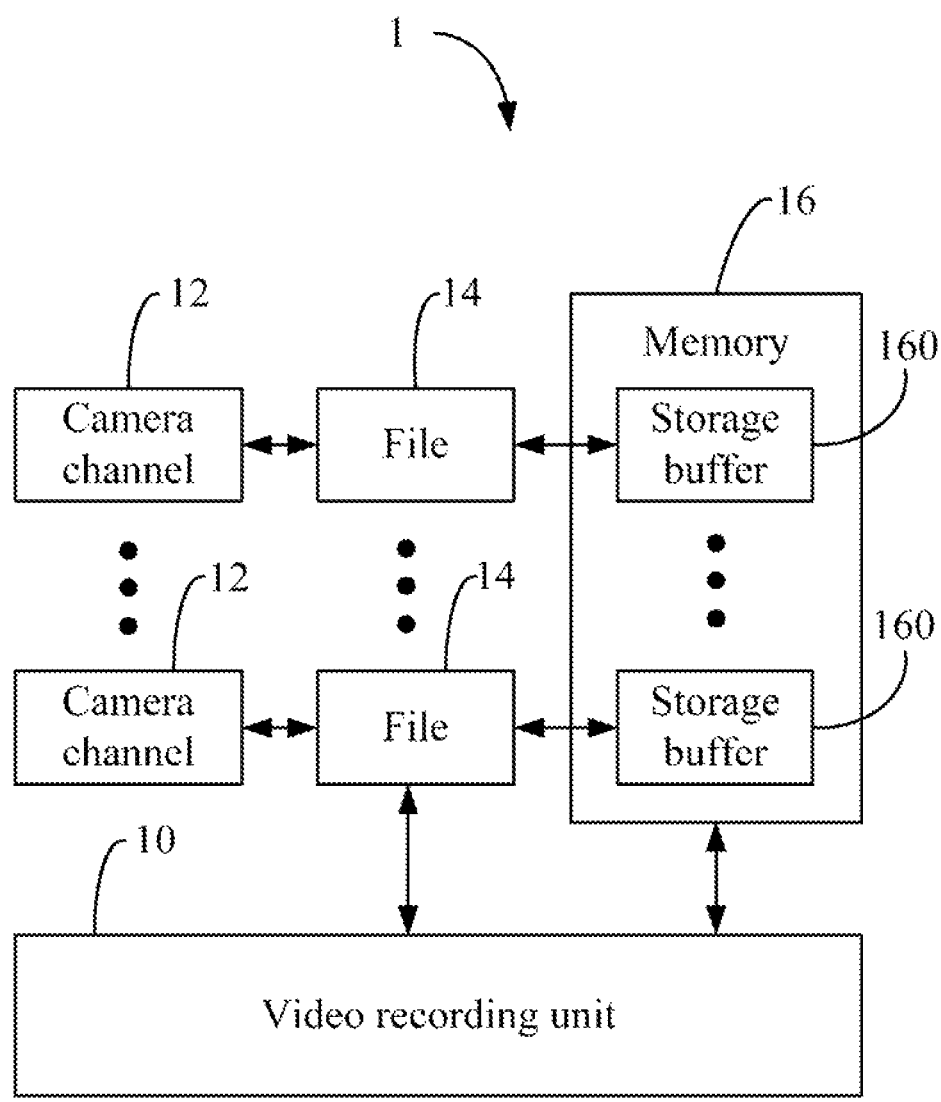
FIG. 1 is a schematic diagram of one embodiment of a network video recorder (NVR) including a video recording unit.

FIG. 1 is a block diagram of one embodiment of a network video recorder (NVR) 1 including a video recording unit 10. The NVR 1 can pre-record video data captured by video capturing devices, such as video cameras or web cameras, for example. Here, pre-recording means that the video data is encoded and processed at the video capturing device, and streamed to the NVR 1 for storage or remote viewing. In the embodiment, the NVR 1 has a series of ports 12, which are electronically connected to the video capturing devices. Each of the ports 12 corresponds to a file 14 of the NVR 1. A file is a fixed allocation of space in a storage buffer 160 of a memory 16 into which the video data transmitted over the corresponding port 12 is recorded. The NVR 1 includes the memory 16 which includes a plurality of the storage buffers 160. Each of the storage buffers 160 stores metadata of any video data recorded in the corresponding file 14. In the embodiment, each of the storage buffers 160 is a circular storage buffer. As will be explained, the NVR 1 is capable of continuing to receive a video stream even after a memory of the NVR 1 is full by automatically dropping (deleting) oldest data. The oldest data is one or more frames of video data recorded in the NVR 1 more early than the other frames of video data.

In the embodiment, the files 14 are all the same size, and the storage buffers 160 are all the same memory size. There are the same number of the files 14 as there are the ports 12 connected to the video capturing devices.

The video recording unit 10 can manage video data written to the files 14 on a first in first out (FIFO) basis, so that once a file is full, the oldest data is deleted frame by frame as new video frames come in, instead of losing newly captured video data. The detailed functions of the video recording unit 10 are described, in reference to FIG. 2 and FIG. 3, below.

Figure 2:
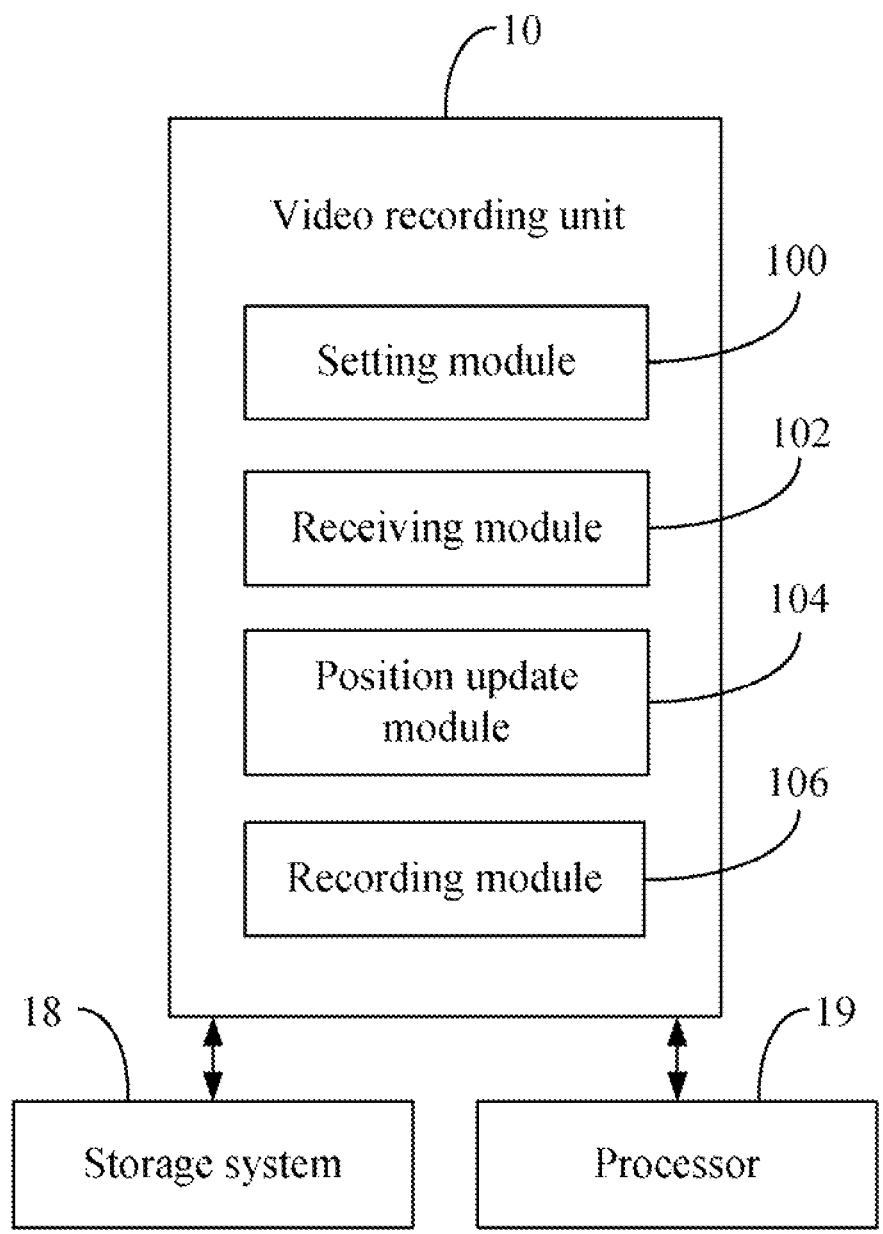
FIG. 2 is a block diagram of function modules of the video recording unit in FIG. 1.

FIG. 2 is a block diagram of function modules of the video recording unit 10 in FIG. 1. In one embodiment, the video recording unit 10 includes a setting module 100, a receiving module 102, a position update module 104, and a recording module 106. Each of the modules 100-106 may be a software program including one or more computerized instructions that are stored in a storage system 18 of the NVR 1, and executed by a processor 19 of the NVR 1.

In one embodiment, the storage system 18 may be a magnetic or an optical storage system, such as a hard disk drive, an optical drive, a compact disc, a digital versatile disc, a tape drive, or other suitable storage medium. The processor 19 may be a central processing unit including a math co-processor.

The setting module 100 sets a plurality of variables, for example four variables. In this embodiment, the variables include a first variable indicating a starting location "prs_start" of video data to be recorded in the file 14, and a second variable indicating an end location "prs_end" of the recorded video data in the file 14. One frame of video data can be recorded in one element of the storage buffer 160. In the embodiment, the storage buffer 160 can be divided into a plurality of same parts, each of the parts is one element for saving a frame of video data, and each element has an index. For example, the storage buffer 160 has six elements, the indices of the six elements are "0," "1," "2," "3," "4," and "5". The third variable indicates a starting location "pri_start" which coincides with the index of the frame of video data, and the fourth variable indicates an end location "pri_end" of that frame.

In order to clearly describe the functions of the video recording unit 10, only one file 14 for receiving the video data is described. However, it may be understood that more than one file can be processed using the method without departing from the spirit of the disclosure.

When a frame of video data is captured by a video capturing device that is electronically connected to the port 12, the frame is transmitted to the NVR 1 over the port 12. The receiving module 102 receives the frame, and the position update module 104 checks whether the storage buffer 160 corresponding to the file 14 has enough space for storing the frame.

Upon the condition that the file 14 is empty, in other words no video data has been stored in the file 14, then "prs_start" and "prs_end" mark the same location.

Upon the NVR 1 receives a frame of video data, the recording module 106 stores the frame of video data in the file 14. The position update module 104 adjusts the end location "prs_end" of the file 14 by one frame, and adjusts the end location "pri_end" of the corresponding storage buffer 160 by one element, namely pri_end=(pri_end+1)%*MAX_INDEX.

Figure 4:
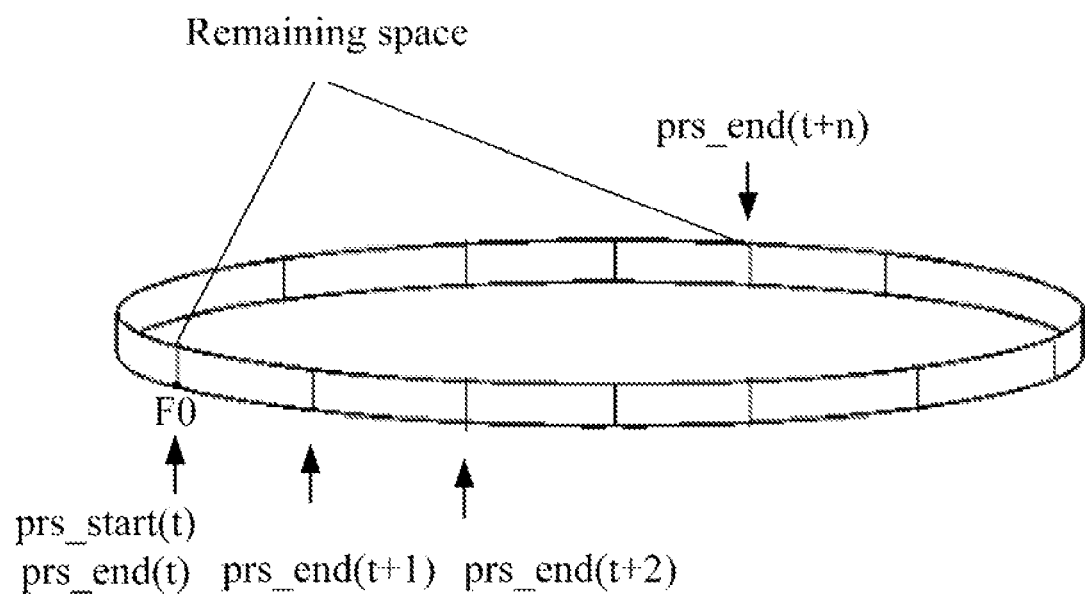
FIG. 4 illustrates an example of a starting location and an end location of recording video data in a file.
Figure 5:
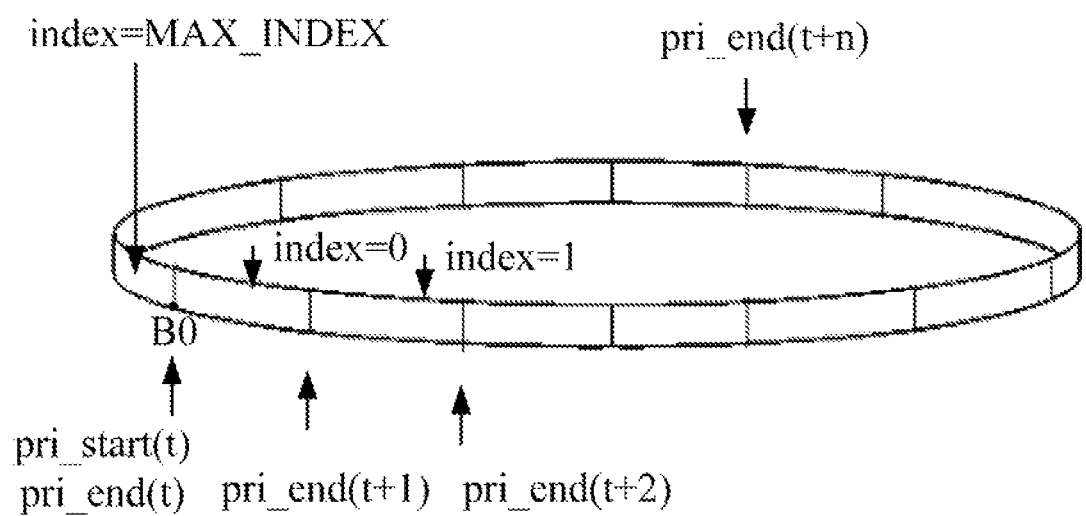
FIG. 5 illustrates an example of a starting location and an end location of an offset of the video data in a storage buffer.

In detail, when the NVR 1 is started, as shown in FIG. 4, the starting location "prs_start(t)" and the end location "prs_end(t)" mark the same location, such as a point F0. At the initial moment, as shown in FIG. 5, the starting location "pri_start(t)" and the end location "pri_end(t)" in the storage buffer 160 mark the same location, point B0. The index of the point B0 is "0". After the frame of video data is saved in the file 14, as shown in FIG. 4, the end location "prs_end" of the file 14 is adjusted to "prs_end(t+1)", and the end location "pri_start" is adjusted to the next element represented by an index "1".

Upon the condition that the frame of video data is not an Intra-frame, the recording module 106 stores the frame into the file 14, and the position update module 104 adjusts the end location "prs_end" of the file 14 by one frame each time.

Upon the condition that the storage buffer 160 corresponding to the file 14 does not have enough space, the position update module 104 deletes a frame from the file 14 according to the FIFO basis. Then, the position update module 104 adjusts the starting location "pri_start" by one element (namely, pri_start=(pri_start+1)%*MAX_INDEX), and adjusts the starting location "prs_start" of the file 14 to the starting location "pri_start" of the frame recorded in the storage buffer 160 (namely, prs_start=storage buffer(pri_start)).

In one embodiment, "MAX_INDEX" is the maximum count of the elements in the storage buffer 160. For example, the storage buffer 160 has six elements, the indices of the six elements are "0," "1," "2," "3," "4," and "5". If the storage buffer 160 corresponding to the file 14 does not have enough space for storing the frame of video data, namely no space related to the six elements is available, the position update module 104 can drop a frame according to the FIFO basis from the file 14, to make space available in the storage buffer 160. For example, the position update module 104 drops the frame in the element related to the index "5," and the storage buffer 160 corresponding to the file 14 then has enough space for recording the frame of video data. The position update module 104 adjusts the starting location "pri_start" of the storage buffer 160 to the element represented by index "5", and changes the starting location "prs_start" of the file 14 to the starting location "pri_start" of the storage buffer 160.

Figure 3:
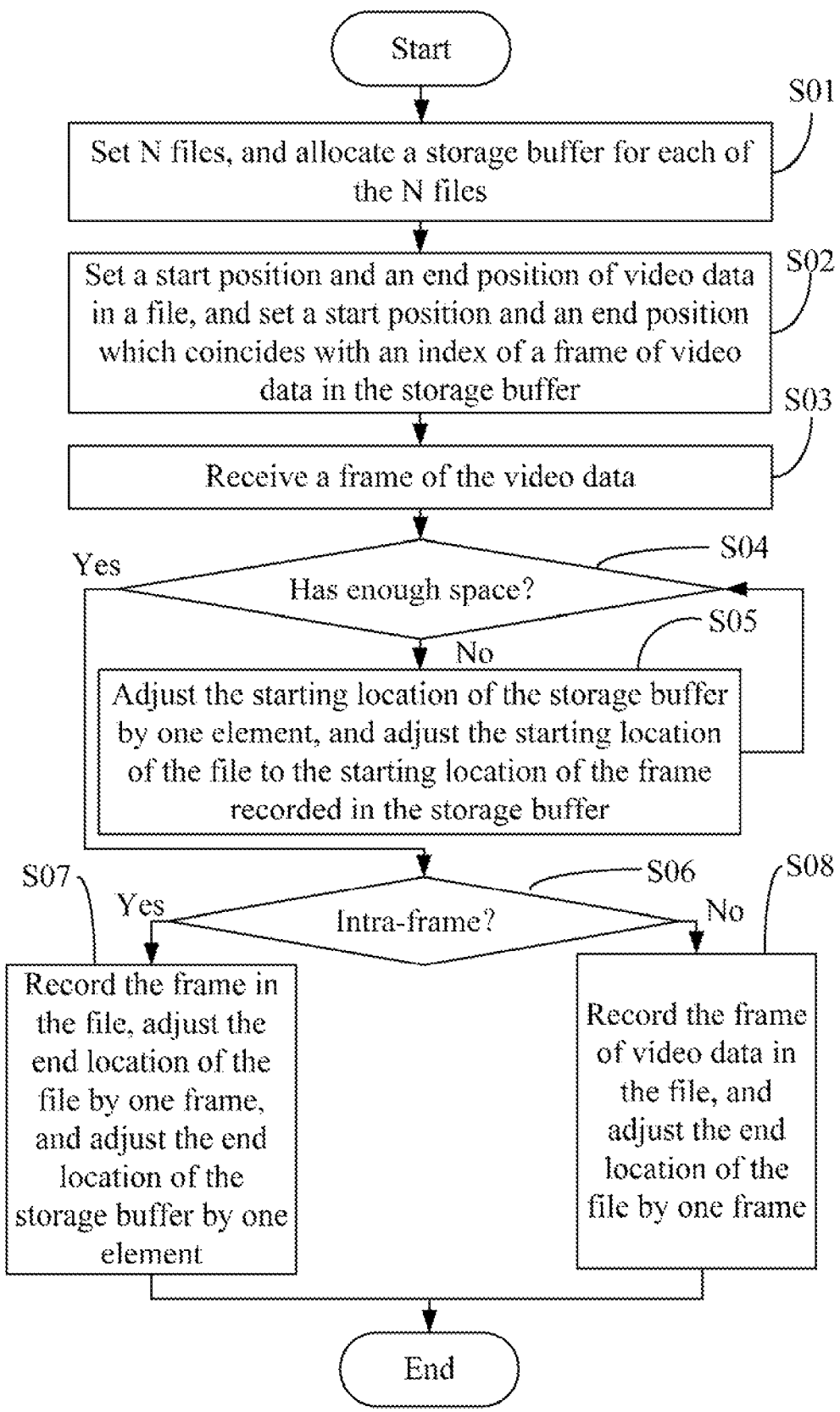
FIG. 3 is a flowchart illustrating one embodiment of a method for recording video data in the NVR of FIG. 1.

FIG. 3 is a flowchart illustrating one embodiment of a method for recording video data in the NVR 1 of FIG. 1. The method can be implemented by a computer-readable program that is executed by the at least one processor 19. Depending on the embodiment, in FIG. 3, additional steps may be added, others removed, and the ordering of the steps may be changed.

In step S01, the setting module 100 sets N files 14 that are all the same size, and allocates the storage buffer 160 for each of the N files 14. The storage buffers 160 in the memory 16 have the same size. In the embodiment, N is equal to a number of the ports 12 connected to the video capturing devices. In order to clearly describe the recording method, only one file 14 for receiving video data is described.

In step S02, the setting module 100 sets a plurality of variables, for example four variables. In the embodiment, the variables include a first variable indicating a starting location "prs_start" of recorded video data in the file 14, and a second variable indicating an end location "prs_end" of the recorded video data in the file 14. One frame of video data can be recorded in one element of the storage buffer 160. Each element has an index. The third variable indicates a starting location "pri_start" which coincides with the index of a frame of video data, and the fourth variable indicates an end location "pri_end" of that frame.

In step S03, the receiving module 102 receives a frame of video data captured by a video capturing device that is electronically connected to the port 12, and transmitted over the port 12.

In step S04, the position update module 104 detects whether the storage buffer 160 corresponding to the file 14 has enough space for storing the frame. If the storage buffer 160 corresponding to the file 14 does not have enough space, step S05 is implemented. If the storage buffer 160 corresponding to the file 14 does have enough space for storing the frame, step S06 is implemented.

In step S05, the position update module 104 deletes a frame according to the FIFO basis from the file 14. In one embodiment, the position update module 104 adjusts the starting location "pri_start" by one element (namely, pri_start=(pri_start+1)%*MAX_INDEX), and adjusts the starting location "prs_start" of the file 14 to the starting location "pri_start" of the frame recorded in the storage buffer 160 (namely, prs_start=storage buffer(pri_start)). "MAX_INDEX" is the maximum count of the elements in the storage buffer 160.

In step S06, the position update module 104 determines whether the frame of video data is the Intra-frame received. If the frame of video data is the Intra-frame, step S07 is implemented. If the frame of video data is not the Intra-frame, the flow goes to step S08.

In step S07, the recording module 106 records the frame of video data in the file 14. The position update module 104 adjusts the end location "prs_end" of the file 14 by one frame, and adjusts the end location "pri_end" of the storage buffer 160 by one element, namely pri_end=(pri_end+1)%*MAX_INDEX. For example, after the frame has been saved in the file 14, as shown in FIG. 4, the end location "prs_end" of the file 14 is adjusted to "prs_end(t+1)", and as shown in FIG. 5, the end location "pri_end" of the frame in the storage buffer 160 is adjusted to the next element represented by an index "1".

In step S08, the recording module 106 records the frame into the file 14, and the position update module 104 adjusts the end location "prs_end" by one frame.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method of a network video recorder (NVR), the method comprising:

setting a starting location and an end location of video data in a file, one frame of the video data is recorded in one element of a storage buffer corresponding to the file, the element having an index;

setting a starting location and an end location of the video data that coincides with the index of a frame of video data in the storage buffer;

receiving a frame of the video data transmitted over a port of the NVR, the frame captured by a video capturing device that is electronically connected to the NVR;

upon the condition that the storage buffer corresponding to the file does not have enough space for storing the frame, adjusting the starting location of the storage buffer by one element, and adjusting the starting location of the file to the starting location of the frame recorded in the storage buffer; and upon the condition that the storage buffer corresponding to the file has enough space to record the frame of video data, and the frame of video data is the Intra-frame, recording the frame in the file, adjusting the end location of the file by one frame, and adjusting the end location of the storage buffer by one element.

2. The method as claimed in claim 1, further comprising:
   setting N files that are the same size; and
   allocating a storage buffer for each of the N files.

3. The method as claimed in claim 2, wherein N is equal to a number of ports of the NVR connected to a video capturing device.

4. The method as claimed in claim 1, further comprising:
   upon the condition that the storage buffer corresponding to the file has enough space to store the frame of video data, and the frame of video data is not the Intra-frame, recording the frame of video data in the file, and adjusting the end location of the file by one frame.

5. A network video recorder (NVR), comprising:
   at least one processor;
   a storage system; and
   one or more modules that are stored in the storage system and executed by the at least one processor, the one or more modules comprising:
   a setting module that sets a starting location and an end location of video data in a file, one frame of video data is recorded in one element of a storage buffer corresponding to the file and the element has an index, and sets a starting location and an end location which coincides with the index of a frame of video data in the storage buffer;
   a receiving module that receives a frame of the video data transmitted over a port of the NVR, the frame is captured by a video capturing device that is electronically connected to the NVR;
   a position update module that adjusts the starting location of the storage buffer by one element, and adjusts the starting location of the file to the starting location of the frame recorded in the storage buffer, upon the condition that the storage buffer corresponding to the file does not have enough space for storing the frame of video data; and
   a recording module that records the frame in the file upon the condition that the storage buffer corresponding to the file has enough space to store the frame of video data; and
   the position update module that adjusts the end location of the file by one frame, and adjusts the end location of the storage buffer by one element, upon the condition that the storage buffer corresponding to the file has enough space to store the frame of video data and the frame of video data is the Intra-frame.

6. The NVR as claimed in claim 5, wherein the setting module further sets N files that are the same size, and allocates a storage buffer for each of the N files.

7. The NVR as claimed in claim 6, wherein N is equal to a number of ports of the NVR connected to a video capturing device.

8. The NVR as claimed in claim 5, wherein the position update module further adjusts the end location of the file by one frame after the frame is saved in the file, upon the condition that the storage buffer corresponding to the file has enough space to store the frame of video data and the frame of video data is not the Intra-frame.

9. A non-transitory storage medium having stored thereon instructions that, when executed by a processor of a network video recorder (NVR), causes the NVR to:
   set a starting location and an end location of video data in a file, one frame of video data is recorded in one element of a storage buffer corresponding to the file and the element has an index;
   set a starting location and an end location of the video data that coincides with the index of a frame of video data in the storage buffer;
   receive a frame of the video data transmitted over a port of the NVR, the frame captured by a video capturing device that is electronically connected to the NVR;
   upon the condition that the storage buffer corresponding to the file does not have enough space for storing the frame, adjust the starting location of the storage buffer by one element, and adjust the starting location of the file to the starting location of the frame recorded in the storage buffer; and
   upon the condition that the storage buffer corresponding to the file has enough space to record the frame of video data, and the frame of video data is the Intra-frame, record the frame in the file, adjusting the end location of the file by one frame, and adjust the end location of the storage buffer by one element.

10. The non-transitory storage medium as claimed in claim 9, wherein the NVR is further caused to:
    set N files that are the same size; and
    allocate a storage buffer for each of the N files.

11. The non-transitory storage medium as claimed in claim 10, wherein N is equal to a number of ports of the NVR connected to a video capturing device.

12. The non-transitory storage medium as claimed in claim 9, wherein the NVR is further caused to:
    upon the condition that the storage buffer corresponding to the file has enough space to store the frame of video data, and the frame of video data is not the Intra-frame, recording the frame of video data in the file, and adjusting the end location of the file by one frame.

* * * * *